US009501814B2

(12) United States Patent
Zhang et al.

(10) Patent No.: US 9,501,814 B2
(45) Date of Patent: Nov. 22, 2016

(54) METHOD AND APPARATUS FOR IMAGE COLOR ENHANCEMENT

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Zhengxin Zhang, Beijing (CN); Yi Zheng, Beijing (CN); Wensen Shi, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 5 days.

(21) Appl. No.: 14/429,156

(22) PCT Filed: Jun. 23, 2014

(86) PCT No.: PCT/CN2014/080540

§ 371 (c)(1),
(2) Date: Mar. 18, 2015

(87) PCT Pub. No.: WO2015/109746

PCT Pub. Date: Jul. 30, 2015

(65) Prior Publication Data

US 2016/0035066 A1 Feb. 4, 2016

(30) Foreign Application Priority Data

Jan. 23, 2014 (CN) .......................... 2014 1 0032242

(51) Int. Cl.

| | |
|---|---|
| ***G06K 9/00*** | (2006.01) |
| ***G06T 5/00*** | (2006.01) |
| ***H04N 1/60*** | (2006.01) |

(52) U.S. Cl.

CPC *G06T 5/00* (2013.01); *H04N 1/60* (2013.01); *G06T 2207/10024* (2013.01); *H04N 1/6005* (2013.01)

(58) Field of Classification Search

CPC .... H04N 1/6005; H04N 1/6027; H04N 1/60; H04N 1/56; G06T 2207/10024; G06T 5/00
See application file for complete search history.

(56) References Cited

U.S. PATENT DOCUMENTS 7,433,104 B2 * 10/2008 Cheo .................... H04N 1/6005 348/E9.053
2003/0031376 A1 2/2003 Liu (Continued)

FOREIGN PATENT DOCUMENTS

| | | | |
|---|---|---|---|
| CN | 1708137 | A | 12/2005 |
| CN | 101383912 | A | 3/2009 |
| CN | 101742339 | A | 6/2010 |
| CN | 102223547 | A | 10/2011 |
| CN | 102769758 | A | 11/2012 |
| CN | 103780797 | A | 5/2014 |

OTHER PUBLICATIONS

Oct. 27, 2014 (CN) International Search Report and Written Opinion for PCT/CN2014/080540.

(Continued)

*Primary Examiner* — Li Liu

(74) *Attorney, Agent, or Firm* — Banner & Witcoff, Ltd.

(57) ABSTRACT

There is provided a method and apparatus for image color enhancement, wherein the method comprises the following steps: S1, collecting color components of an image, converting the color components from a RGB space into a HSV space, and obtaining parameters in the HSV space as hue, saturation, and value respectively; S2, performing gain operations selectively on the saturation and the value by judging the saturation in the HSV space; S3, converting the obtained parameters in the HSV space back into the RGB space. In the above method for image color enhancement, after the color components are converted into the HSV space, firstly, the saturation value is judged, and the gain operations are performed selectively by utilizing the gain function according to the judgment result.

7 Claims, 5 Drawing Sheets

(56) References Cited

U.S. PATENT DOCUMENTS

2005/0276470 A1* 12/2005 Kim .................... H04N 1/6027 382/162
2008/0080784 A1* 4/2008 Ozdemir ............. H04N 1/6005 382/274
2009/0022395 A1* 1/2009 Cho .................... H04N 1/6027 382/167
2012/0307270 A1* 12/2012 Nakajima ........... H04N 1/6016 358/1.9
2015/0138227 A1* 5/2015 Zhao ....................... H04N 5/57 345/601

OTHER PUBLICATIONS

Oct. 27, 2014 (CN) Written Opinion for PCT/CN2014/080540—Eng Tran.
Oct. 21, 2015—(CN)—First Office Action Appn 201410032242.9 with English Tran.

* cited by examiner

METHOD AND APPARATUS FOR IMAGE COLOR ENHANCEMENT

The application is a U.S. National Phase Entry of International Application No. PCT/CN2014/080540 filed on Jun. 23, 2014, designating the United States of America and claiming priority to Chinese Patent Application No. 201410032242.9 filed on Jan. 23, 2014. The present application claims priority to and the benefit of the above-identified applications and the above-identified applications are incorporated by reference herein in their entirety.

TECHNICAL FIELD

The present invention relates to a method and apparatus for image color enhancement.

BACKGROUND

With the development of the display technique, the requirements for the quality of displaying image from the user are higher and higher. Human beings can obtain a better visual experience from the vivid colors, and thus at present more and more driving chips for liquid crystal displays incorporate a function of image color enhancement.

Currently, the general methods for image color enhancement can be divided into two classes, wherein in a first group of methods for image color enhancement, same scales and shifts are made on the primary color components, i.e., Red color, Green color and Blue Color, without space conversion, so as to achieve the purpose of keeping the tone unchanged; in a second group of methods for image color enhancement, the color components are converted from RGB space to other spaces, a corresponding operation processing is performed, and then the color components are converted back into the RGB space. Compared to the first group of methods for image color enhancement, the second group of methods for image color enhancement is better, since it can achieve the enhancement on the image colors. The purpose of enhancing image color is to improve the display quality of image; however, after the space conversion, if the gains in the operation are improper, that is, the gain operation is made on all the components without judgment, the following problems might occur after the image color enhancement: in a case of grey level in solid color, the color as displayed can vary due to the gain operation on the saturation value, resulting in color bias in the grey level in solid color; in a case of a color picture, the phenomenon of over-saturation can occur when the picture such as a skin color is display due to the gain operation on the saturation value.

Therefore, if no analysis and judgment is made on the parameters of each component in the converted space after the space conversion, it is impossible to perform a proper gain operation, and in turn a scheme for the gain operation can not be selected, further resulting in color bias and over-saturation, thus resulting in deteriorating the image quality.

SUMMARY

In view of the above, the technical problem to be solved is how to perform a proper color enhancement without over-saturation or excessive enhancement so as to improve the image quality.

To solve the above problems, an embodiment of the present disclosure provides a method for image color enhancement, comprising steps of: S1, collecting color components of an image, converting the color components from a RGB space into a HSV space, and obtaining parameters in the HSV space as hue, saturation, and value respectively; S2, performing gain operations selectively on the saturation and the value by judging the saturation in the HSV space; S3, converting the obtained parameters in the HSV space back into the RGB space.

Optionally, the step of S2 comprises: judging whether the saturation is equal to zero, and if the saturation is equal to zero, the gain operation is performed only on the value; otherwise, the gain operations are performed on both the saturation and the value.

Optionally, if the saturation is not equal to zero, the method further comprises: comparing the saturation and the value with a preset saturation and a preset value respectively; if the saturation exceeds the preset saturation and the value exceeds the preset value, no gain operation is performed, proceeding to step S3 directly; otherwise, gain operations are performed on the saturation and the value.

Optionally, the hue value is kept unchanged when the gain operations are performed on the saturation and the value.

Optionally, the step S1 of converting the color components from the RGB space into the HSV space comprises: S11, deriving a maximum and a minimum from the three components R, G, and B; S12, calculating and obtaining the hue value in the parameters of the HSV space from the three components R, G, and B, the maximum, and the minimum; S13, calculating and obtaining the saturation by deriving the maximum from the three components R, G, and B; and S14, calculating and obtaining the value according to the maximum and the minimum.

Optionally, after the hue value is obtained, the step of S12 further comprises: magnifying the hue value 60 times; if the obtained hue value is less than zero, adding 360 on a basis of the obtained hue value as a current hue value.

Optionally, the preset saturation and the preset value are established by sampling the saturation and the value of a series of images and then processing the sampled results.

Optionally, a gain function used for the gain operation in the step S2 is an exponential function and is expressed as a formula $S1=a^s$, wherein S represents the saturation obtained after the space conversion, S1 represents the saturation after the gain operation, and a represents a constant.

Optionally, a gain function used for the gain operation in the step S2 is an exponential function and is expressed as a formula $V1=b^v$, wherein V represents the value obtained after the space conversion, V1 represents the value after the gain operation, and b represents a constant.

To solve the above problems, an embodiment of the present disclosure further provides an apparatus for image color enhancement, comprising: a first conversion unit, a gain execution unit, and a second conversion unit; wherein the first conversion unit comprises a collecting unit and a conversion sub-unit, wherein the collecting unit is configured to collect color components of an image, and the conversion sub-unit is configured to convert the color components from a RGB space into a HSV space to obtain parameters of the HSV space as hue, saturation and value respectively; the gain execution unit is configured to selectively perform gain operations on the saturation and the value by judging the saturation of the HSV space; the second conversion unit is configured to convert the obtained parameters of the HSV space back into the RGB space.

Optionally, the gain execution unit comprises a first judgment unit, a first gain operation unit and a second gain operation unit, wherein the first judgment unit is configured to judge whether the saturation value is equal to zero; when the saturation value is equal to zero, going into the first gain operation unit, the gain operation is perform on the value; otherwise, going into the second gain operation unit and the first gain operation unit in turn, gain operations are perform on both the saturation and the value respectively.

Optionally, the gain execution unit further comprises: a second judgment unit configured to compare the saturation value and the value to a preset saturation and a preset value respectively; if the saturation value exceeds the preset saturation and the value exceeds the preset value, no gain operation is performed, going into the second conversion unit directly; otherwise, going into the second gain operation unit, the gain operation is performed on the saturation, and then going into the first gain operation unit, the gain operation is performed on the value.

Optionally, the conversion sub-unit comprises: a first calculation unit configured to derive a maximum and a minimum from the three components R, G, and B; a second calculation unit configured to calculate and obtain the hue value in the parameters of the HSV space from the three components R, G, and B, the maximum, and the minimum; a third calculation unit configured to calculate and obtain the saturation by deriving a maximum from the three components R, G, and B; and a fourth calculation unit configured to calculate and obtain the value according to the maximum and the minimum.

Optionally, performing the gain operation on the hue value by the second calculation unit comprising: magnifying the hue value 60 times; if the obtained hue value is less than zero, adding 360 on a basis of the obtained hue value as a current hue value.

Optionally, a gain function used for the gain operation on the saturation by the second gain operation unit is an exponential function and is expressed as a formula $S1=a^S$, wherein S represents the saturation obtained after the space conversion, S1 represents the saturation after the gain operation, and a represents a constant.

Optionally, a gain function used for the gain operation on the value by the first gain operation unit is an exponential function and is expressed as a formula $V1=b^V$, wherein V represents the value obtained after the space conversion, V1 represents the value after the gain operation, and b represents a constant.

The embodiments of the present disclosure provide a method and apparatus for image color enhancement, wherein the method comprises steps of: S1, collecting color components of an image, converting the color components from a RGB space into a HSV space, and obtaining parameters in the HSV space as hue, saturation, and value respectively; S2, performing gain operations selectively on the saturation and the value by judging the saturation in the HSV space; S3, converting the obtained parameters in the HSV space back into the RGB space. In the above method for image color enhancement, the collected image is converted from the RGB space closely related to the color components into the HSV space, then the three space parameters H, S and V are analyzed and judged, and the gain operation and the enhancement scheme is selected by utilizing the gain functions during the color enhancement, which enables to avoid the problems such as color bias in the grey level of the solid color, over-saturation of the skin color, and the like, while the image colors are enhanced, thus improving the quality of the image.

DETAILED DESCRIPTION

Hereinafter, detailed descriptions will be given to the implementations of the present disclosure with reference to the accompanying drawings and the embodiments. It should be noted that the following embodiments are used for illustrating the present invention, but not for limiting the scope of the present invention in any way.

First Embodiment

Figure 1:
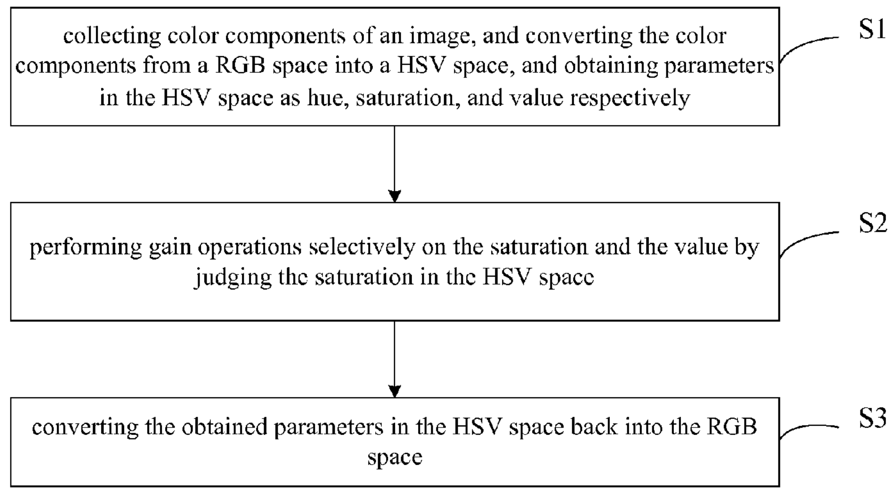
FIG. 1 is a flowchart illustrating steps of a method for image color enhancement provided in a first embodiment of the present disclosure.

There is provided a method for image color enhancement in the first embodiment; as illustrated in FIG. 1, the method comprises the following steps:

Step S1, collecting color components of an image, and converting the color components from the RGB space into the HSV space, and obtaining parameters in the HSV space as hue, saturation, and value respectively;

Step S2, performing gain operations selectively on the saturation and the value by judging the saturation in the HSV space, wherein the saturation value ranges from 0 to 1; and Step S3, converting the obtained parameters in the HSV space back into the RGB space.

In the above method, the parameters in the converted HSV space are analyzed and judged, and a gain operation is made on the saturation(S) and value(V) properly without changing the hue(H), avoiding color bias in the grey level in solid color, and influence on the image quality due to the over-saturation in a color image after the gain processing. Therefore, while rich colors of an image as displayed are enhanced, the image quality can be also improved.

Figure 2:
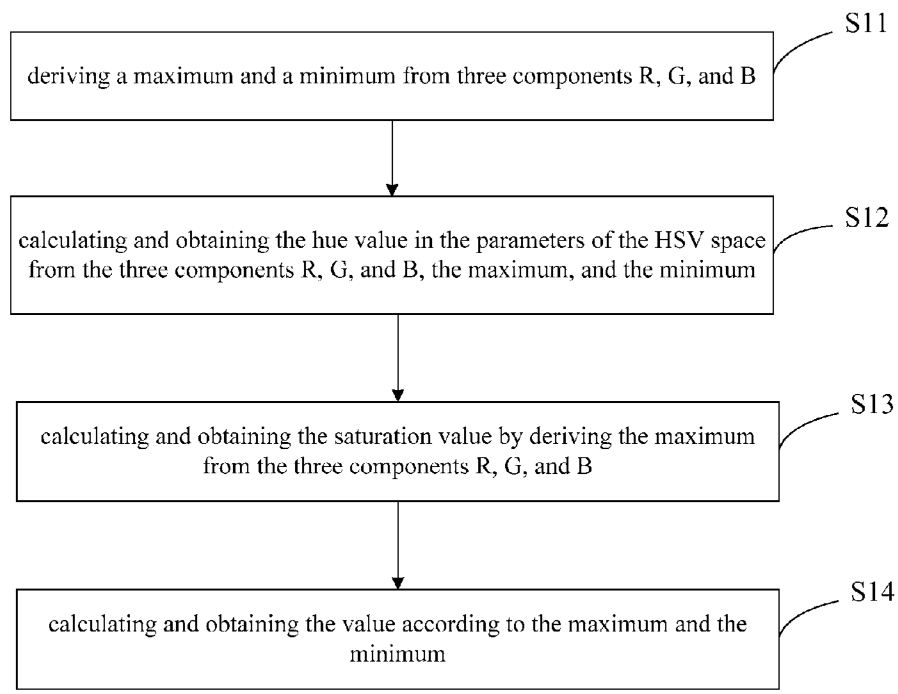
FIG. 2 is a flowchart illustrating sub-steps in the step S1 in the first embodiment of the present disclosure.

Optionally, as illustrated in FIG. 2, the step S1 of converting the color components from the RGB space into the HSV space in the present embodiment comprises:

step S11, deriving a maximum and a minimum from three components R, G, and B;

step S12, calculating and obtaining the hue value in the parameters of the HSV space from the three components R, G, and B, the maximum, and the minimum;

step S13, calculating and obtaining the saturation by deriving a maximum from the three components R, G, and B; and step S14, calculating and obtaining the value according to the maximum and the minimum.

For instance, in the present embodiment, the step S12 further comprises: after the hue value is obtained, the hue value is magnified 60 times; if the obtained hue value is less than zero, 360 is added on the basis of the obtained hue value as the current hue value.

The above conversion from the RGB space into the HSV space can be implemented as the following algorithm:

Max=max(R, G, B)

Min=min(R, G, B)

If R=max, H=(G−B)/(max−min)

If G=max, H=2+(B−R)/(max−min)

If B=max, H=4+(R−G)/(max−min)

H=H*60

If H<0, H=H+360

V=max(R, G, B)

Figure 3:
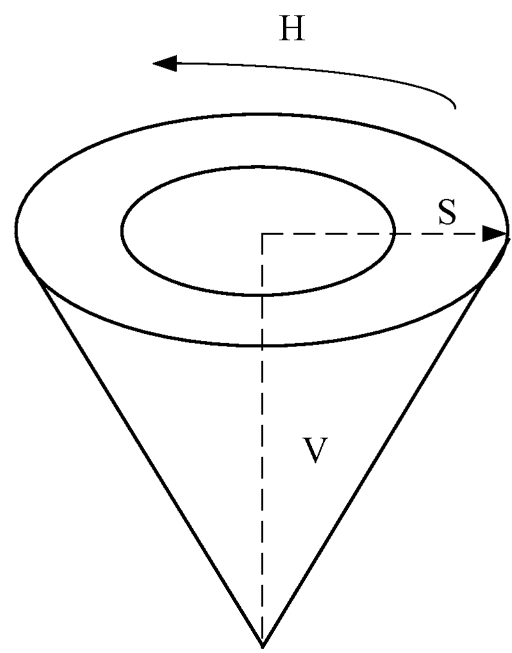
FIG. 3 is a diagram illustrating a HSV color model in the first embodiment of the present disclosure.

S=(max−min)/max wherein, R, G, and B are the color components of the collected image in the RGB space, Max represents the maximum in the three components R, G, and B obtained from the maximum function max(R, G, B), Min represents the minimum in the three components R, G, and B obtained from the minimum function min(R, G, B), H represents the hue component converted into the HSV space, S represents the saturation component, and V represents the value component. The hue H is measured in angle, and ranges from 0° to 360°, calculating from the red color in an anticlockwise, with the red color at 0°, the green color at 120°, and the blue color at 240°; their complementary colors are: the yellow color is at 60°, the cyan color is at 180°, and the magenta color is at 240°; the saturation S ranges from 0.0~1.0; the value V ranges from 0.0 (black)~1.0 (white); the diagram of the HSV color model is illustrated in FIG. 3.

Optionally, the step of S2 in the present embodiment comprises judging whether the saturation is equal to zero, and when the saturation is equal to zero, the gain operation is performed only on the value; otherwise, the gain operations are performed on both the saturation and the value.

For instance, when the saturation is not equal to zero, the method further comprises the following:

comparing the saturation and the value with a preset saturation and a preset value respectively; if the saturation exceeds the preset saturation and the value exceeds the preset value, no gain operation is performed, proceeding to step S3 directly; otherwise, the gain operations are performed on both the saturation and the value Herein, the preset saturation S' and the preset value V' are established by sampling the saturation and value of a series of images and processing the sampled results.

Figure 4:
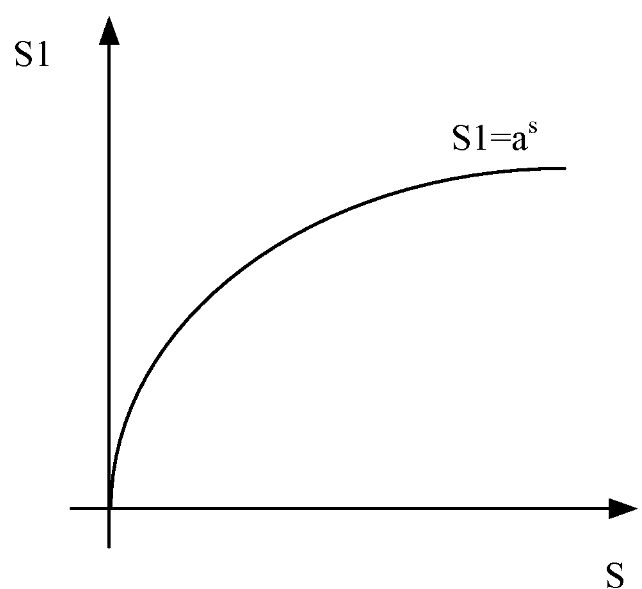
FIG. 4 is a curve diagram illustrating a gain function of the saturation S in the first embodiment of the present disclosure.

A gain function used for a gain operation on the saturation is an exponential function and is expressed as a formula S1=$a^S$, wherein S represents the saturation obtained after the space conversion, S1 represents the saturation after the gain operation, a represents a constant. FIG. 4 illustrates a curve diagram of the gain function for the saturation S.

Figure 5:
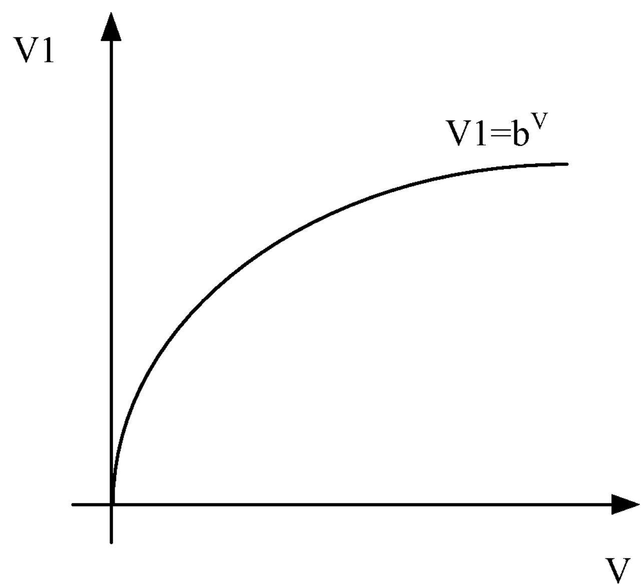
FIG. 5 is a curve diagram illustrating a gain function of the value V in the first embodiment of the present disclosure.

A gain function used for a gain operation on the value is an exponential function and is expressed as a formula V1=$b^V$, wherein V represents the value obtained after the space conversion, V1 represents the value after the gain operation, and b represents a constant. FIG. 5 illustrates a curve diagram of the gain function for the value V.

The constant a and b in the above formula are both determined from the empirical values, and different gain effects can be obtained by selecting different constants.

Figure 6:
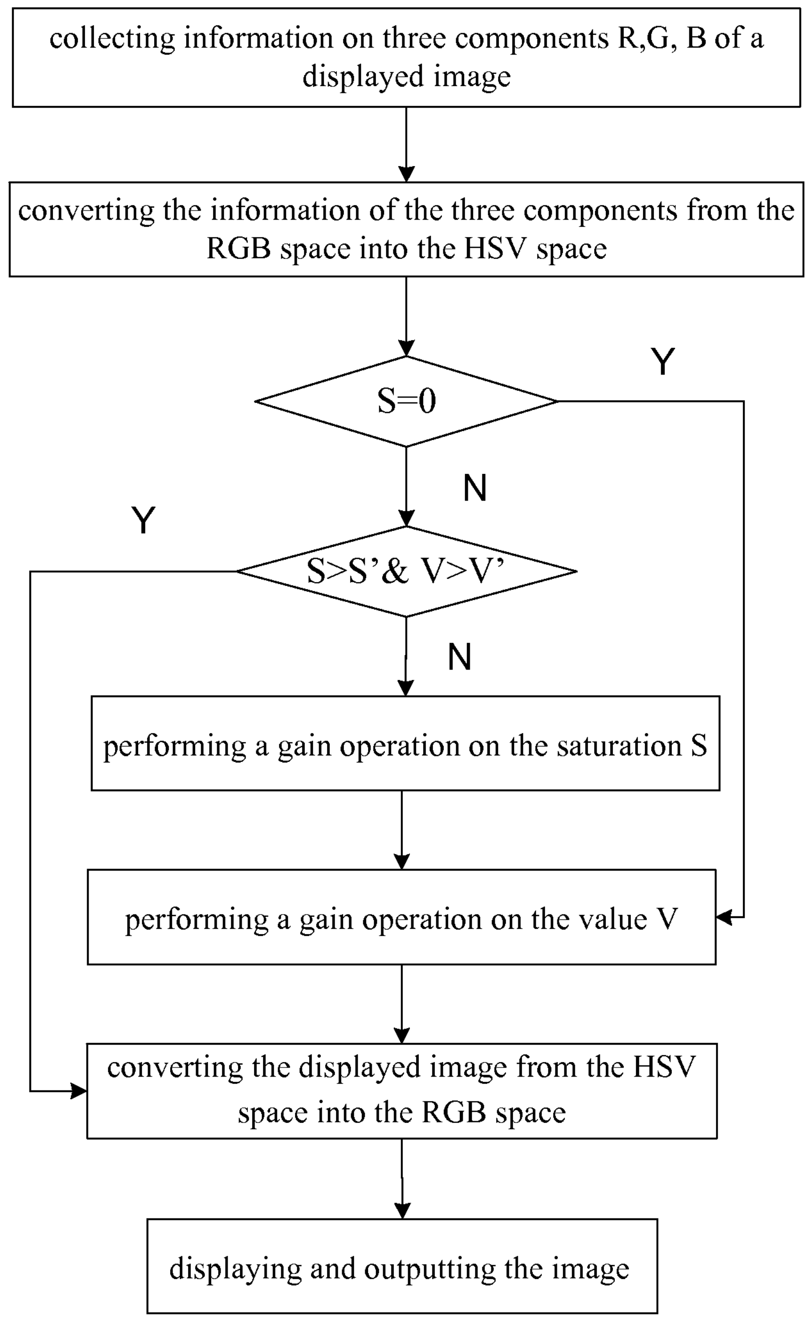
FIG. 6 is a generic flowchart illustrating the method for image color enhancement in a first embodiment of the present disclosure.

FIG. 6 illustrates a general flow of the method for image color enhancement; as illustrated in FIG. 6, firstly, information on the three components R, G, B of an image is collected, and the information of the three components is converted from the RGB space into the HSV space; the saturation S is judged without changing the hue H; when S=0, the gain operation is made only on the value V, after the operation the displayed image is converted from the HSV space into the RGB space, and the converted image is displayed and outputted; when S≠0, the relationship between S and S' and that between V and V' are judged, if S>S' and V>V', the step of performing a gain operation on the saturation S and the value V is skipped directly, the image is converted from the HSV space into the RGB space directly, and then the converted image is displayed and outputted; otherwise, the gain operation is performed on the saturation S and the value V in turn, finally the operated image is converted from the HSV space into the RGB space, and the converted image is displayed and outputted.

In the above method, R, G and B data is sampled, and the data is first converted from the RGB space into the HSV space; then, by analyzing the amount of H, S and V data, a scheme for the color enhancement operation is selected, and the gain functions are applied so as to enhance the rich colors while such problems as a color bias in the grey level of the solid color in the displayed image, or an over-saturation of the skin color, etc. are avoided; therefore, the method for image color enhancement can be applied to the optimization of an image color enhancement function of a LCD display.

Second Embodiment

Figure 7:
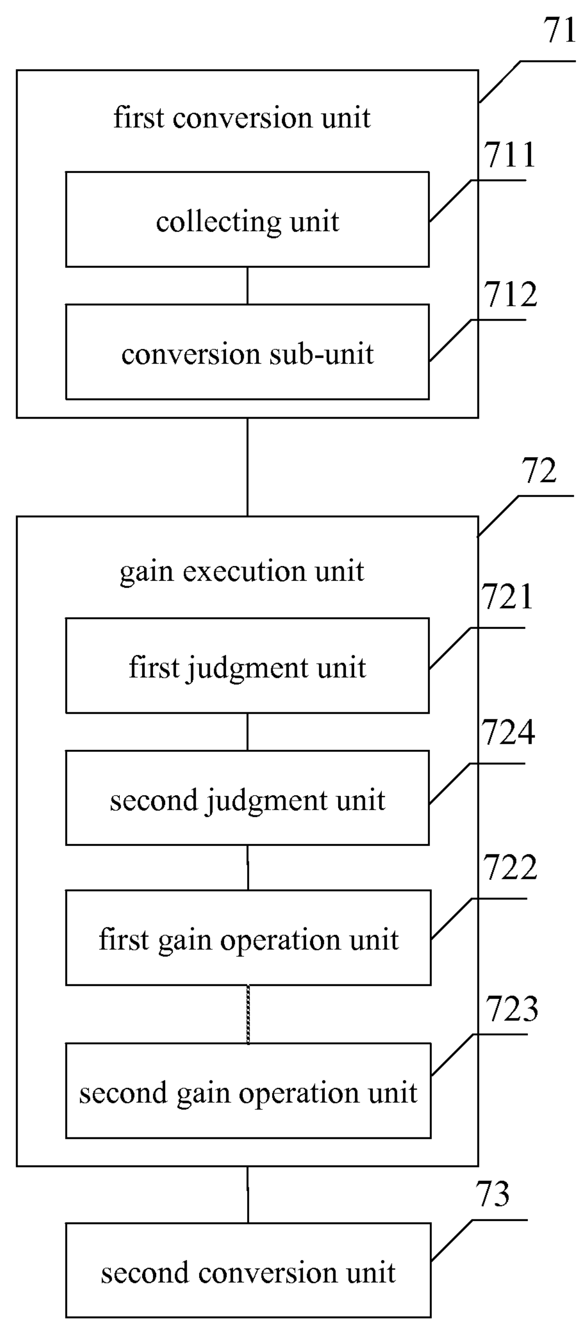
FIG. 7 is a schematic diagram illustrating a configuration of an apparatus for image color enhancement provided in a second embodiment of the present disclosure.

On the basis of the above, it is provided an apparatus for image color enhancement in the second embodiment of the present disclosure, and FIG. 7 illustrates a schematic diagram of a configuration of the apparatus for image color enhancement. As illustrated in FIG. 7, the apparatus comprises a first conversion unit 71, a gain execution unit 72, and a second conversion unit 73; wherein the first conversion unit 71 comprises a collecting unit 711 and a conversion sub-unit 712, the collecting unit 711 is configured to collect color components of an image, and the conversion sub-unit 712 is configured to convert the color components from the RGB space into the HSV space and obtain parameters of the HSV space as hue, saturation and value respectively; the gain execution unit 72 is configured to selectively perform gain operations on the saturation and the value by judging the saturation of the HSV space; the second conversion unit 73 is configured to convert the obtained parameters of the HSV space back into the RGB space.

Optionally, the gain execution unit 72 in the present embodiment comprises a first judgment unit 721, a first gain operation unit 722 and a second gain operation unit 723, wherein the first judgment unit 721 is configured to judge whether the saturation value is equal to zero; when the saturation value is equal to zero, going into the first gain operation unit 722, the gain operation is performed on the value; otherwise, going into the second gain operation unit 723 and the first gain operation unit 722 in turn, gain operations are performed on both the saturation and the value respectively.

Optionally, the gain execution unit 72 in the present embodiment further comprises a second judgment unit 724 configured to compare the saturation value and the value to a preset saturation and a preset value respectively; if the saturation value exceeds the preset saturation and the value exceeds the preset value, no gain operation is performed, going into the second conversion unit 73 directly; otherwise, going into the second gain operation unit 723, the gain operation is performed on the saturation, and then going into the first gain operation unit 722, the gain operation is performed on the value.

Optionally, the conversion sub-unit 712 in the present embodiment comprises: a first calculation unit configured to derive a maximum and a minimum from the three components R, G, and B; a second calculation unit configured to calculate and obtain the hue value in the parameters of the HSV space from the three components R, G, and B, the maximum, and the minimum; a third calculation unit configured to calculate and obtain the saturation by deriving a maximum from the three components R, G, and B; and a fourth calculation unit configured to calculate and obtain the value according to the maximum and the minimum.

Optionally, a gain function used for the gain operation by the second gain operation unit 723 is an exponential function and is expressed as a formula $S1=a^S$, wherein S represents the saturation obtained after the space conversion, S1 represents the saturation after the gain operation, and a represents a constant.

Optionally, a gain function used for the gain operation by the first gain operation unit 722 is an exponential function and is expressed as a formula $V1=b^V$, wherein V represents the value obtained after the space conversion, V1 represents the value after the gain operation, and b represents a constant.

The working flow of the apparatus is described as below: the collecting unit 711 collects color components of an image, the conversion sub-unit 712 converts the color components from the RGB space into the HSV space to obtain parameters of the HSV space as hue H, saturation S and value V respectively; the first judgment unit 721 in the gain execution unit 72 judges whether the saturation value S is equal to zero; if S is equal to zero, the first gain operation unit 722 performs a gain operation on the value according to the gain function $V1=b^V$ with the hue value H unchanged; if S is not equal to zero, the saturation value and the value are further compared to the preset saturation and the preset value respectively; if the saturation value exceeds the preset saturation and the value exceeds the preset value, no gain operation is performed, going into the second conversion unit 73 directly; otherwise, going into the second gain operation unit 723, a gain operation is performed on the saturation according to the gain function $S1=a^S$, and then going into the first gain operation unit 722, a gain operation is performed on the value according to the gain function $V1=b^V$.

In the above apparatus for image color enhancement, the R, G and B data is collected firstly, and the data is converted from the RGB space into the HSV space; then, by analyzing the amount of H, S and V data, a scheme for the color enhancement operation is selected, and the gain functions are applied so as to enhance the rich colors while such problems as a color bias in the grey level of the solid color in the displayed image, or an over-saturation of the skin color, etc. are avoided; therefore, the apparatus for image color enhancement can be applied to the optimization of an image color enhancement function of a LCD display.

The above embodiments are only for illustrating the present disclosure, and are not intended to limit the present invention in any way. Those skilled in the art can make various variants and modifications without departing from the spirit and scope of the present invention. All the equivalents belong to the scope of the invention, and the protection scope of the present invention is defined by the claims.

The present application claims the priority of a Chinese application with No. 201410032242.9, filed on Jan. 23, 2014, and the disclosure of which is entirely incorporated herein by reference.

What is claimed is:

1. A method for image color enhancement, comprising steps of:

a) collecting color components of an image, and converting the color components from a RGB space into a HSV space, and obtaining parameters in the HSV space as hue, saturation, and value respectively;

b) performing gain operations selectively on the saturation and the value by judging the saturation in the HSV space; and c) converting the obtained parameters in the HSV space back into the RGB space, wherein the step of b) comprises judging whether the saturation value is equal to zero, wherein if the saturation value is equal to zero, the gain operation is performed only on the value; otherwise, gain operations are performed on both the saturation and the value, wherein if the saturation value is not equal to zero, the method further comprises:

comparing the saturation value and the value with a preset saturation and a preset value respectively; if the saturation value exceeds the preset saturation and the value exceeds the preset value, no gain operation is performed, proceeding to step c) directly; otherwise, gain operations are performed on the saturation and the value, and wherein the preset saturation and the preset value are established by sampling the saturation and the value of a series of images and processing the sampled results, wherein a first gain function used for the gain operation in the step b) is an exponential function and is expressed as a formula $S1=a^s$, wherein S represents the saturation obtained after the space conversion, S1 represents the saturation after the gain operation, and a represents a constant, and wherein a second gain function used for the gain operation in the step b) is an exponential function and is expressed as a formula $V1=b^v$, wherein V represents the value obtained after the space conversion, V1 represents the value after the gain operation, and b represents a constant.

2. The method according to claim 1, wherein the hue value is kept unchanged when the gain operations are performed on the saturation and the value.

3. The method according to claim 1, wherein the step a) of converting the color components from the RGB space into the HSV space comprises the steps of:

deriving a maximum and a minimum from three components R, G, and B;

calculating and obtaining the hue value in the parameters of the HSV space from the three components R, G, and B, the maximum, and the minimum;

calculating and obtaining the saturation value by deriving the maximum from the three components R, G, and B; and calculating and obtaining the value according to the maximum and the minimum.

4. The method according to claim 3, wherein, after the hue value is obtained, the step of calculating and obtaining the hue value in the parameters of the HSV space from the three components R, G, and B, the maximum, and the minimum further comprises magnifying the hue value 60 times; if the obtained hue value is less than zero, adding 360 on a basis of the obtained hue value as a current hue value.

5. An apparatus for image color enhancement, comprising a first conversion unit, a gain execution unit, and a second conversion unit;

wherein the first conversion unit comprises a collecting unit and a conversion sub-unit; wherein the collecting unit is configured to collect color components of an image, and the conversion sub-unit is configured to convert the color components from a RGB space into a HSV space and obtain parameters of the HSV space as hue, saturation and value respectively;

the gain execution unit is configured to selectively perform gain operations on the saturation and the value by judging the saturation of the HSV space; and the second conversion unit is configured to convert the obtained parameters of the HSV space back into the RGB space, wherein the gain execution unit comprises a first judgment unit, a first gain operation unit and a second gain operation unit, wherein the first judgment unit is configured to judge whether the saturation value is equal to zero; when the saturation value is equal to zero, going into the first gain operation unit, the gain operation is performed on the value; otherwise, going into the second gain operation unit and the first gain operation unit in turn, the gain operations are performed on both the saturation and the value respectively, wherein the gain execution unit further comprises a second judgment unit configured to compare the saturation value and the value to a preset saturation and a preset value respectively; if the saturation value exceeds the preset saturation and the value exceeds the preset value, no gain operation is performed, going into the second conversion unit directly; otherwise, going into the second gain operation unit, the gain operation is performed on the saturation, and then going into the first gain operation unit, the gain operation is performed on the value, wherein a gain function used for the gain operation on the saturation by the second gain operation unit is an exponential function and is expressed as a formula $S1=a^S$, wherein S represents the saturation obtained after the space conversion, S1 represents the saturation after the gain operation, and a represents a constant, and wherein a gain function used for the gain operation on the value by the first gain operation unit is an exponential function and is expressed as a formula $V1=b^V$, wherein V represents the value obtained after the space conversion, V1 represents the value after the gain operation, and b represents a constant.

6. The apparatus according to claim 5, wherein the conversion sub-unit comprises the following:

a first calculation unit configured to derive a maximum and a minimum from three components R, G, and B;

a second calculation unit configured to calculate and obtain the hue value in the parameters of the HSV space from the three components R, G, and B, the maximum, and the minimum;

a third calculation unit configured to calculate and obtain the saturation value by deriving the maximum from the three components R, G, and B; and a fourth calculation unit configured to calculate and obtain the value according to the maximum and the minimum.

7. The apparatus according to claim 6, wherein performing the gain operation on the hue value by the second calculation unit comprises the following: magnifying the hue value 60 times; if the obtained hue value is less than zero, adding 360 on a basis of the obtained hue value as a current hue value.

* * * * *